Nov. 30, 1948.   R. H. GRIEST   2,455,247
ELECTRIC MOTOR CONTROL APPARATUS
Filed June 12, 1945
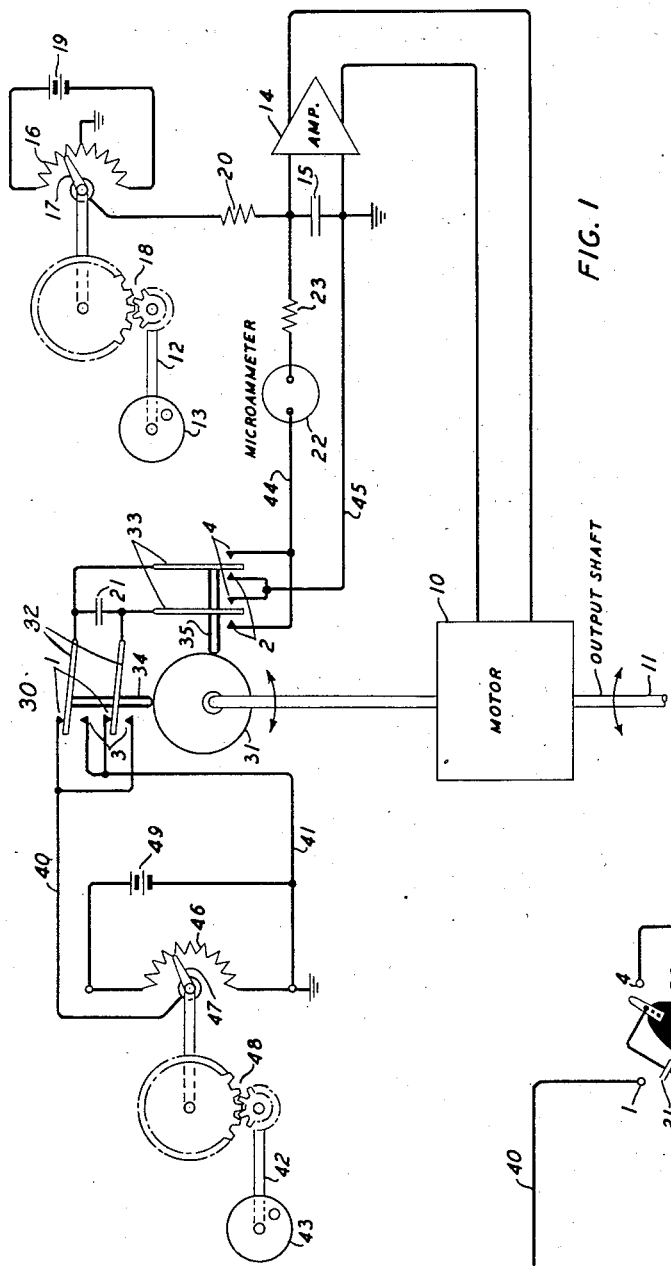
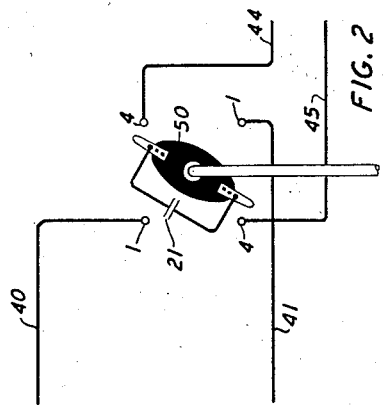
INVENTOR
R. H. GRIEST
BY
G. F. Heuerman
ATTORNEY.

Patented Nov. 30, 1948

2,455,247

UNITED STATES PATENT OFFICE 2,455,247

ELECTRIC MOTOR CONTROL APPARATUS

Raymond H. Griest, Summit, N. J., assignor to Bell Telephone Laboratories, Incorporated, New York, N. Y., a corporation of New York Application June 12, 1945, Serial No. 598,997

3 Claims. (Cl. 318—309)

1

This invention relates to electric control apparatus and particularly to such apparatus for setting up a voltage for controlling the energization of an electric motor in response to angular displacement of a shaft.

It is frequently desired to set up a current or voltage the direction and polarity of which, respectively, correspond to the direction of rotation of a shaft and the magnitude of which is substantially proportional to the speed of the shaft. For example, in a control system in which there is set up in response to displacement of an input or handwheel shaft and impressed upon a motor for causing it to drive an output shaft a control current the direction of which changes with change of direction of rotation of the handwheel shaft, the motor speed, and therefore the speed of the output shaft, may not be proportional to the control current. In the improved control system disclosed herein there is therefore provided means for generating and impressing upon the input of the motor control circuit in opposition to said control current a feedback current substantially proportional to the speed of the output shaft. There is also provided means under control of a second input shaft for changing the ratio of the feedback current to the speed of the output shaft.

It is an object of the invention to provide improved apparatus for supplying electric energy the magnitude of which is substantially proportional to the speed of a shaft and the direction or polarity of which corresponds to the direction of rotation of the shaft.

Another object is to provide improved apparatus for controlling the rotation of a motor-driven shaft in response to displacement of a control shaft.

A further object of the invention is to provide improved apparatus for causing the rotation of a motor-driven shaft under control of displacement of a plurality of independent control shafts.

In the drawing, Fig. 1 is a schematic view of a motor control system embodying the invention; and Fig. 2 is a schematic view of a modification of a portion of Fig. 1.

Referring to the drawing, there is disclosed a system for controlling the energization of a direct current motor 10, and thereby the rotation of an output shaft 11 to which may be coupled a device to be driven by the motor, in response to angular displacement of an input shaft 12 which may be rotated by means of a handwheel 13 secured thereto. Direct current is supplied to the

2 motor 10 from the output of a differential, direct current amplifier 14, the amplitude of the current varying with the voltage to which a condenser 15, connected across its input terminals, is charged and the direction of the current being reversed in response to a reversal of the polarity of the voltage across the terminals of condenser 15. If desired, of course, a two-phase alternating current motor may be employed having alternating current of fixed amplitude and phase impressed upon one of its windings, the phase and amplitude of the alternating current supplied to its other winding varying in accordance with the polarity and magnitude, respectively, of the voltage at the output of amplifier 14 or of the voltage across condenser 15. There is provided a potentiometer comprising a resistance member 16 which may be wound upon an annular form and a movable contact member 17 which is coupled through gearing 18 to the input shaft 12 but electrically insulated therefrom. The terminals of a battery 19 are connected to the end terminals of the potentiometer resistance member 16 and the mid-terminal of the potentiometer resistance member 16 is grounded. The contact member 17 of the potentiometer is connected through a resistor 20 to the ungrounded terminal of condenser 15.

When the shaft 12 is in a reference position such that the contact member 17 makes contact with the mid-terminal of potentiometer resistance member 16, both terminals of condenser 15 are at ground potential, no current is supplied from amplifier 14 to motor 10 and the output shaft 11 of the motor is stationary. When the handwheel shaft 12 is displaced in one direction from the reference position, current is supplied from battery 19 for charging the condenser 15 in one direction and, when the handwheel shaft is displaced in the opposite direction from the reference position, current is supplied from battery 19 for charging the condenser 15 in the opposite direction, the voltage in the condenser charging circuit varying in a desired manner with respect to the displacement of the shaft 12 from the reference position.

The condenser 15 is also connected in a second circuit in which is set up a voltage of such polarity as to tend to cause the voltage across condenser 15 to decrease. This second circuit comprises a condenser 21 of relatively small capacity, known as a "dipper" condenser, and may include a microammeter 22 for indicating the average current flowing in the circuit which is substantially proportional to the average voltage set up across the condenser 21 and the speed of the shaft 11. The resistance of this circuit, including that of the meter 22, is represented by the resistance element 23. The voltage to which condenser 15 is charged is maintained small with respect to the voltage to which condenser 21 becomes charged so that the discharge of condenser 21 into the discharge circuit, as will be further described below, is not appreciably affected by the prior charge on condenser 15. There is provided a cam switch 30 comprising a cam 31 driven by the motor 10, four pairs of contacts 1, 2, 3 and 4, and two pairs of armatures 32 and 33 which are actuated by cam followers 34 and 35, respectively, the pair of armatures 32 being associated with contacts 1 and 3 and the pair of armatures 33 being associated with contacts 2 and 4. When the motor drives the cam 31 in the counter-clockwise direction, as viewed in the figure, circuits are completed through the pairs of contacts 1, 2, 3 and 4 repeatedly in that order. When the direction of rotation of the motor is reversed, the circuits are completed in the reverse order, that is, through the pair of contacts 1, 4, 3 and 2 repeatedly in that order. A battery 49 having its negative terminal grounded is provided for supplying current for charging the condenser 21. There is provided a potentiometer having a resistance winding 46 connected across the terminals of battery 49 and a contact member 47 engaging the resistance member 46. The contact member 47 is coupled through gearing 48 to a shaft 42 which may be angularly displaced by turning a handwheel 43 secured to the shaft 42. The potential of the lead 40 connected to the contact member 47 with respect to that of the grounded lead 41 may thus be varied, if desired, by displacing the shaft 42 by means of the handwheel 43 in one direction or the other.

It will be noted that one contact of each of pairs 1 and 3 is connected to the lead 40, that one contact of each of pairs 2 and 4 is connected to lead 44 and that the remaining contacts are connected to ground by way of lead 41 or lead 45. When a charging circuit for condenser 21 is completed through switch contacts 1, condenser 21 is charged with its upper plate positive with respect to its lower plate, as viewed in the figure, and when the condenser is charged through a circuit completed through contacts 3, the polarity of the voltage across the condenser 21 is reversed. An advantage of charging the condenser 21 alternately in opposite directions is that any small residual charge which remains at the time that the condenser is disconnected from the discharge circuit will be removed when the condenser is subsequently connected to the charging circuit. If for a given direction of rotation of motor 10 the charging of condenser 21 were always in the same direction, the average discharge current would slowly increase by a small amount and therefore, the discharge current would not be accurately proportioned to the speed of output shaft 11. Charging condenser 21 alternately in opposite directions removes the effect of the residual charge and thereby increases the accuracy of the control. When a circuit is completed from condenser 21 to the terminals of condenser 15 through switch contacts 2, the lower plate of condenser 21 is connected through lead 44 and microammeter 22 to the upper plate of condenser 15, the upper plate of condenser 21 being connected to ground through lead 45, and when the circuit is completed through switch contacts 4, the upper plate of condenser 21 is connected to lead 44 and the lower plate to lead 45.

Therefore, when the shaft 13 is displaced from the reference position in a direction to cause condenser 15 to be charged so that its upper plate becomes positive with respect to its grounded lower plate and, as a result the motor 10 is energized to cause output shaft 11 to rotate in a counter-clockwise direction, for example, the circuits will be closed through the pairs of switch contacts 1, 2, 3, 4 in succession in that order. Assuming for the present that shaft 42 is in a fixed position, the condenser 21 will become charged to a certain voltage through a circuit comprising the pair of contacts 1. When the pair of armatures 32 is in neutral position and the pair of armatures 33 is brought into engagement with the pair of contacts 2, a circuit including meter 22 and condenser 15 will be completed for discharging condenser 21. When this discharge circuit is closed, the positive terminal of condenser 21 is connected to the grounded terminal of condenser 15, and the negative terminal of condenser 21 is connected to the positive terminal of condenser 15. Thus the discharge current of condenser 21 is in such a direction as to cause the charge on condenser 15 to decrease during the discharging periods of condenser 21.

A circuit is next completed through contacts 3 to charge the condenser 21 in the opposite direction, that is, with its lower plate positive. When a circuit is next closed through contacts 4, the condenser 21 is again discharged through the discharge circuit in such a direction as to cause the charge on condenser 15 to be reduced. When the shaft 12 is displaced in the opposite direction from the reference position, the condenser 15 is charged in a direction to make its upper plate negative with respect to ground, to cause the motor 10 to drive the output shaft 11 in the reverse direction, and to cause the cam switch contacts to be closed in succession in the reverse order. As before, the discharge current of condenser 21 is in such a direction as to tend to reduce the charge on condenser 15.

When the position of shaft 42, and therefore the setting of potentiometer 46, is fixed, the average current flowing in the discharge circuit of condenser 21 and meter 22 is proportional to the frequency of repetition of the alternate charging and discharging of condenser 21 and, therefore, proportional to the speed of output shaft 11. When the displacement of shaft 12 from the reference position is increased, for example, to cause the charging current from source 19 flowing into condenser 15 to increase, the voltage across condenser 15 increases to cause the speed of motor 10 to increase. The discharge current of condenser 21 thus increases until such time as the average discharge current which tends to reduce the voltage across condenser 15 is equal to the average current from source 19 flowing into condenser 15, at which time the average voltage across condenser 15 is constant, and the motor runs at a constant speed determined by the setting of potentiometer 16. Similarly, when the displacement of shaft 12 is decreased, the average current flowing from source 19 into condenser 15 decreases to cause the voltage across the condenser and the speed of motor 10 to decrease until the average current in the discharge circuit has decreased to a value equal to the average current from source 19 flowing into condenser 15. The maximum voltage to which condenser 15 is charged should preferably be as small a fraction of the voltage to which condenser 21 is charged as the largest percentage error allowable in the speed control. In order to maintain the voltage across condenser 15 at a relatively small maximum value the capacitance of condenser 15 should be as much larger than that of condenser 21 as is possible without sacrificing sensitivity. The resistance of the charging and discharging circuits of condenser 21 should be sufficiently low that the condenser will be substantially completely charged and discharged each cycle at the highest speed of motor 10 reached during operation. Under these conditions the speed of motor 10 and output shaft 11 will vary inversely with the voltage in the charging circuit of condenser 21 and, therefore, where this voltage is proportional to the displacement of shaft 42, the speed of shaft 11 will vary inversely with the displacement of shaft 42.

If for some reason, an increase of load for example, the motor 10 is running at less than the correct speed corresponding to a certain setting of input shaft 12, the feedback current, that is the current proportional to the repetition rate at which condenser 21 is charged and discharged, is reduced thus increasing the voltage across condenser 15 and therefore the voltage across the input terminals of amplifier 14. The energization of motor 10 is thus increased to bring it up to the correct speed. In a similar manner the energization of motor 10 is reduced if it tends to run at a speed higher than the correct speed corresponding to a certain displacement of the control shaft 12.

In some cases it may be desired to change the ratio of the feedback current to the speed of output shaft 11. This may be done by displacing the shaft 42 by means of handwheel 43 to change the setting of potentiometer 46, thus changing the voltage to which condenser 21 is repeatedly charged.

There may be employed, instead of the cam switch 30 of Fig. 1, a switching arrangement of the type shown in Fig. 2. In accordance with this modification there is employed a switch arm 50 coupled to the shaft of motor 10 but electrically insulated therefrom. The dipper condenser 21 is mounted on the switch arm 50 and the terminals thereof are conductively connected to the brushes at the ends of the switch arm, respectively. The leads 40 and 41 are connected to a pair of diametrically opposed contacts 1 while the leads 44 and 45 are connected to the diametrically opposed contacts 4. As the motor shaft rotates, therefore, the condenser 21 will be alternately connected to a charging circuit comprising leads 40 and 41 and a discharging circuit comprising leads 44 and 45. A similar arrangement employing two switch arms and two dipper condensers, one associated with each switch arm, may be employed if desired. In this case one of the dipper condensers is connected to the charging circuit and the other dipper condenser is simultaneously connected to the discharging circuit.

What is claimed is:

1. In combination, a motor, a first condenser of relatively large capacity, means responsive to the charge on said first condenser for controlling the energization of said motor to control its speed in accordance with the voltage across said first condenser and to control its direction of rotation in accordance with the polarity of the voltage across said first condenser, means for charging said first condenser comprising in series with said condenser a resistance means and a source of voltage the polarity and magnitude of which may be changed, a second condenser of relatively small capacity, means under control of said motor for alternately charging said second condenser and for discharging said second condenser during intervals separating successive charging periods through a circuit comprising said first condenser, the alternate charging and discharging of said second condenser being at a rate proportional to the speed of said motor, the voltages of said first and second condenser being in aiding relationship to cause the charge on said first condenser to decrease during said discharging intervals of said second condenser, thereby causing the motor to run in a direction determined by the polarity of the voltage of said source at a speed proportional to the magnitude of the voltage of said source.

2. A combination in accordance with claim 1 in which there is provided means for varying the voltage to which said second condenser is intermittently charged to control the ratio of the speed of said motor to the magnitude of the voltage of said source.

3. Means for controlling the speed and direction of rotation of a motor comprising an energizing circuit for said motor including a first condenser of relatively large capacity, a charging circuit for said first condenser including a source of voltage, a control shaft, means for controlling the polarity of the voltage from said source in said charging circuit in accordance with the direction of displacement of said control shaft from a fixed reference position and for controlling the magnitude of said voltage in accordance with the amount of the displacement of said control shaft from said fixed reference position, a second condenser of relatively small capacity, means controlled by said motor for intermittently charging said second condenser alternately in opposite directions and for discharging said condenser during periods separating successive charging periods through a circuit comprising said first condenser to thereby reduce the charge on said first condenser, the repeated charging and discharging of said second condenser occurring at a rate proportional to the motor speed, thereby causing the motor speed to be proportional to the displacement of said control shaft from said reference position.

RAYMOND H. GRIEST.

REFERENCES CITED

The following references are of record in the file of this patent:

UNITED STATES PATENTS

| Number | Name | Date |
| --- | --- | --- |
| 1,571,960 | Needham | Feb. 9, 1926 |
| 1,844,243 | Crout | Feb. 9, 1932 |
| 2,091,025 | Breer et al. | Aug. 24, 1937 |
| 2,184,627 | Watson | Dec. 26, 1939 |

FOREIGN PATENTS

| Number | Country | Date |
| --- | --- | --- |
| 548,618 | Great Britain | Oct. 16, 1942 |